United States Patent [19]
Svaty, Jr.

[11] Patent Number: 5,507,188
[45] Date of Patent: Apr. 16, 1996

[54] STRUCTURAL MONITORING SYSTEM

[76] Inventor: Karl J. Svaty, Jr., 8225 N. Oliver, Valley Center, Kans. 67147

[21] Appl. No.: 449,673

[22] Filed: May 24, 1995

Related U.S. Application Data

[62] Division of Ser. No. 73,593, Jun. 8, 1993, Pat. No. 5,421,204.

[51] Int. Cl.$^6$ .................................................. G01L 1/26
[52] U.S. Cl. .................................................. 73/786
[58] Field of Search .................................. 73/1 DV, 786, 73/577, 579, 582; 340/870.02, 870.03

[56] References Cited

U.S. PATENT DOCUMENTS

| | | | |
|---|---|---|---|
| 3,688,271 | 8/1972 | Rouse | 340/172.5 |
| 4,480,480 | 11/1984 | Scott et al. | 73/769 |
| 4,604,706 | 8/1986 | Fisher, Jr. et al. | 364/507 |
| 5,111,897 | 5/1992 | Snyder et al. | 177/32 |

*Primary Examiner*—Robert Raevis
*Attorney, Agent, or Firm*—Richard P. Stitt

[57] ABSTRACT

A method and device are provided for sensing and collecting structural deformation data on structures over time to permit structural integrity analysis of the structure and determination of structure life expectancy and need for repair or reconstruction of the structure.

5 Claims, 2 Drawing Sheets

STRUCTURAL MONITORING SYSTEM

This application is a divisional of application Ser. No. 08/073,593 filed on Jun. 08, 1993, now Pat. No. 5,421,204.

FIELD OF THE INVENTION

This invention relates to monitoring and determination of the structural integrity of bridges, buildings, transmission towers and the like. Specifically, sensors are attached to the structure to measure various parameters of structural movement from which a baseline reading is determined which may then be compared with later readings from the same structure in order to determine changes in the natural frequency of the structure and decay of structural integrity.

BACKGROUND OF THE INVENTION

All man-made structures are subject to stresses and strains during the course of their existence which directly affect the structural integrity of the object. In time, the accumulation of stress, strain and vibration can result in degradation of materials making up the structure and the points of attachment between materials. In the case of a transmission tower, the force of wind against the structure as well as ground transmitted vibration can degrade the structural integrity of the transmission tower. Similar types of stresses and vibration, and in particular earthquake vibration, can degrade multistory buildings. One particular structure which presents a continuing need for verification of structural integrity is the bridge or freeway overpass. These structures are continually subjected to repetitive loading, often in excess of limits, as well as both ground and traffic vibration. This results in deterioration of the bridge structure eventually requiring repair or replacement of the entire bridge itself.

Presently, however, determinations of structural integrity are generally estimated by assuming parameters of loading frequency and maximum loading weight in order to make an estimate of bridge life. These estimates combined with visual inspection have been utilized to determine when bridge replacement should occur or when a reduction in the posted weight limits of a bridge or highway overpass should be made.

For both safety and economy, it is desirable to accurately determine the structural integrity of a transmission tower, building or bridge. In the particular case of bridges and highway overpasses, it is necessary for state and federal governmental entities to detect when bridge replacement should occur and to be able to forecast such replacements to avoid injuries and for proper financial management. This task is complicated by the fact that knowledge of the actual stresses to which any individual bridge has been subjected is largely unknown.

While estimations of traffic loading and stress and inspections of bridge exteriors can be made, structural degradation cannot be accurately predicted or determined as no means exist for documenting the stress history of a particular structure. Such loading history would allow engineers to determine whether a particular structure had been subjected to a greater or lesser degree of loading than estimated. This information would assist the ability to forecast bridge replacement in two ways-first, in making an early determination of which bridges are in fact structurally impaired, but not as yet exhibiting visible signs of degradation; and second, in determining which bridges may be selected for extended service due to fewer and lighter loading since their construction.

Therefore, it is an object of the present invention to provide a means for documenting the loading and vibrational stress applied to a structure during the lifetime of the structure;

Another object of the present invention is to allow comparisons to be made over the lifetime of a structure with baseline data on the particular structure in order to determine when sufficient structural degradation has occurred to require replacement;

Another object of the present invention is to provide a means of identifying which bridges and other structures may receive an extended useful life and to distinguish those structures from structures subject to overloading and a reduced structural lifetime; and Yet another object of the present invention is to provide a means of forecasting the need to replace bridges and other structures through accumulation and comparison of structural stress and loading data on individual structures.

Other objects and advantages of this invention will become apparent from the following description taken in connection with the accompanying drawings, wherein is set forth by way of illustration and example, an embodiment of this invention.

SUMMARY OF THE INVENTION

An apparatus and method are provided which enable the long-term analysis and evaluation of the structural integrity of transmission towers, buildings, bridges, freeway overpasses and the like in order to evaluate their useful life and present safety status. The method of analysis is accomplished through the use of an apparatus comprising strain gauge sensors applied to the structure at predetermined locations for measurement of structure maximum strain and maximum dynamic amplitude.

Data gathered by the sensors is then transmitted to a data recorder for storage of the collected data or to a computer for data analysis and comparison. The received data may then be transmitted to a central facility for comparison of data with baseline data on the particular structure and for analysis of structural degradation and safety and for scheduling of structural repair or replacement.

DESCRIPTION OF THE PREFERRED EMBODIMENT

Figure 1:
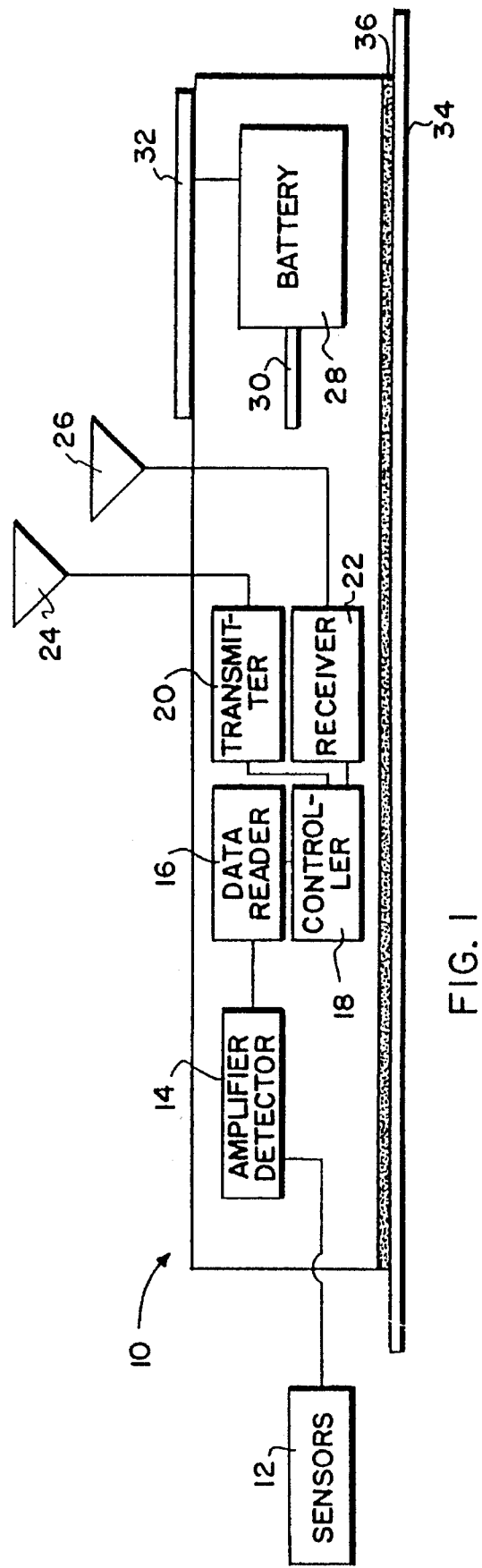
FIG. 1 is a schematic representation of the monitor system showing the sensors attached to the amplification, data recording, transmitting, and power equipment.
Figure 2:
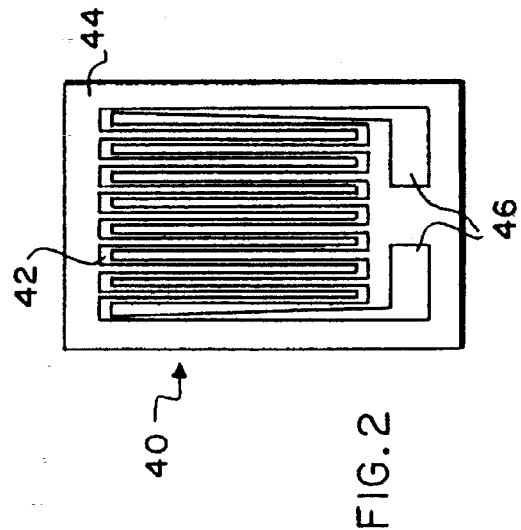
FIG. 2 shows a typical resistance wire strain gauge or sensor which is attached to the structure to be monitored.

Referring to FIG. 1, the equipment modules of structural monitoring system 10 are shown in schematic representation. Sensor 12 is attached to critical areas of the structure to detect strain on the structure at points of significant amplitude. Selection of the points of attachment for sensor 12 is described hereinafter. Sensor 12 is, in a preferred embodiment, an electrical resistance wire strain gauge 40 (FIG. 2). Strain gauge 40 is comprised of a foil resistance wire element 42 attached to an adhesive backing 44. Connector terminals 46 are at either end of resistance wire 42 and serve to connect the strain gauge to detector/amplifier 14.

Strain gauge 40 is attached to the structure at selected points in order to detect the maximum strain endured by the structure during various types of loading. For example, in the case of a bridge it is of interest to collect data on the point of critical strain generated by deflection of the road bed as traffic passes across it. In this manner, the impact of traffic on the structural integrity of the bridge roadway can be monitored. Alternatively, where wind induced swaying is a significant consideration it may be of interest to attach sensor 12 to a bridge support tower or other position in order to monitor the effects of such lateral forces on the structure.

Resistance wire strain gauge 40 operates on the principal that as the structure responds to an applied load various expansions and contractions of the structural surface will occur and strain gauge 40 attached to the structure also will expand and contract producing a change in the resistance of foil resistance wire 42. This change in resistance of the circuit of sensor 12 is detected by detector-amplifier 14. This change in resistance can then be correlated with the load required to produce the degree of deformation in the structure detected by sensor 12.

Sensor 12 also includes a second strain gauge, like that of FIG. 2, which is placed at a site near or on the structure which is unlikely to receive significant structural loading and therefore significant expansion or contraction. This resistance wire temperature sensor 12 is utilized to correct for temperature changes in strain sensor 12 which detects the structural strain. It will be appreciated that as sensor 12 in most cases will be located outside and subject to extremes of temperature, it is necessary to correct for the expansion and contraction of resistance wire 42 which occurs due to temperature effects. The second temperature sensor accomplishes this by being linked through a Wheatstone bridge to strain sensor 12. This will then compensate for changes in temperature of the sensor.

Sensor 12 should be attached to the structure at locations for detection of maximum information related to structural integrity. This locating of sensor 12 is accomplished by performing a structural analysis on the specific structure in order to determine the locations of the structure displaying significant motion or actions. This then allows locating sensor 12 at the portion of the structure most responsive to loading and vibration. Such a structural analysis is a well known technique in the engineering art.

The structural analysis also permits determination of the expected response of the structure through mathematical modeling. The modeling allows a comparison of the accuracy of the signal from sensor 12 with the calculated expected response from the model. This comparison is also conducted in practical fashion by loading the structure with a known mass and examining the detected response from sensor 12 for comparison with the calculated response of the mathematical model of the structure.

Comparison of the expected response with the detected response is necessary in order to assure that sensor 12 is properly located and installed. The output from sensor 12 should be close to that response calculated by the structural analysis. If the calculated response and detected response are not similar, then sensor placement should be reexamined or the initial structural integrity should be reviewed.

The second aspect of a comparison of the calculated response with the initial detected response is to provide baseline data on the structure for comparison with future information received from monitor 10. The existence of baseline data, taken soon after the completion of the structure, provides a point of comparison from which a reduction in structural integrity can be referenced.

Another important aspect of obtaining the initial baseline data on the structure is for analysis of design procedures employed in the development of the structure. Design procedures that allow for excessive deflection or stress will be identified and can be eliminated from future structures. As no standard procedures currently exist for such verification of design procedures the present invention will provide the opportunity for effecting such an analysis in conjunction with monitoring the safety of the structure over its lifetime.

Once a signal has been detected by amplifier-detector 14 from sensor 12 it is transferred to data reader 16. Data reader 16 is intended to collect and store the information as each sensor 12 responds to stress in the structure. After data has been collected at data reader 16 it may then be processed on site by controller 18.

The amplified signal from amplifier-detector 14 is read by data reader 16. Data reader 16 converts the analog signal from amplifier-detector 14 into a digital array. This signal is further converted in order to analyze two measurements specific to the structure. First the signal is converted by Fourier transform to provide the frequency domain of the detected signal. Second the signal is then examined to determine points of greatest magnitude. The signal is also examined for other peaks of significance. Once the significant peaks of amplitude and frequency spectrum have been determined this will then represent a signature for the particular structure to be utilized in future analysis.

All structural elements in structures vibrate at a frequency peculiar to that particular structure. This frequency is known in the art as the "natural frequency" of the structure and is a function of both the structure's weight and stiffness. As the stiffness of the structure begins to change due to age and deterioration, the natural frequency of the structure also will change. A change in the natural frequency of a structure is an important indicator that deterioration of the structure is occurring meriting a more detailed analysis to determine the specific reasons for the cause of the change in the natural frequency. As the present invention permits initial establishment of the baseline natural frequency of a structure and allows continuous monitoring of the structure, changes in the natural frequency of the structure can be determined by comparison with the baseline data.

After data reader 16 has converted and collected the data resulting from the output of amplifier detector 14, controller 18 records the maximum detected signal magnitude and the frequency at which it was detected. This data is stored in memory for future use. Each controller 18 is assigned an individual code to permit transmission of the data recorded in the controller 18 to a remote central location for analysis. If a controller 18 is attached to multiple sensors 12, each sensor 12 is connected to a separate channel within controller 18 and is assigned a secondary access code to allow individual data recording and transmission.

Each monitor system 10 is equipped with a transmitter 20 and a receiver 22 in order that the data stored in controller 18 can be conveniently transmitted. As many structures utilizing structural monitoring system 10 will be in distant locations or locations spread far from one another (i.e., remote transmission towers and bridges along a highway system) it is especially convenient if the data stored in controller 18 can be remotely accessed. Transmitter 20 and receiver 22 accomplish this purpose by allowing radio communication between controller 18 and the remote central data processing location.

As each controller 18 is assigned an individual code, the central processing facility can transmit a message, including the individual code of the particular controller and code of the particular sensor channel, which is then received by antenna 26 and receiver 22. This allows initiation of a command to controller 18 and transmitter 20 to begin sending data via antenna 24 to the remote central processing location. This procedure also permits remote monitoring of the operation of monitor 10 and avoids the need to conduct on-site inspections to determine the operational status of monitor 10 and to retrieve data. Transmitter 20 and receiver 22 can be equipped to function with both local and satellite transmissions depending upon the remoteness of the location of the structure. Alternatively, a vehicle can be equipped with the required communications equipment in order to serve as a mobile data collection and processing facility.

Monitor 10 is powered, in a preferred embodiment, by battery 28 which is recharged by solar panel 32. Power lead 30 from battery 28 connects to each module of monitor 10 in order to power the system.

Once data is received in the remote data processing location, the magnitude of the structure actions can be recorded as well as the particular frequency at which the maximum of the amplitude spectrum occurred. These two parameters are then compared with the baseline data of the structure as well as compared to future data on the structure. In this manner a complete structural history can be continually recorded, compared to previous data, and utilized for continuing structural analysis and for projecting determinations of needed structure replacement.

Figure 3:
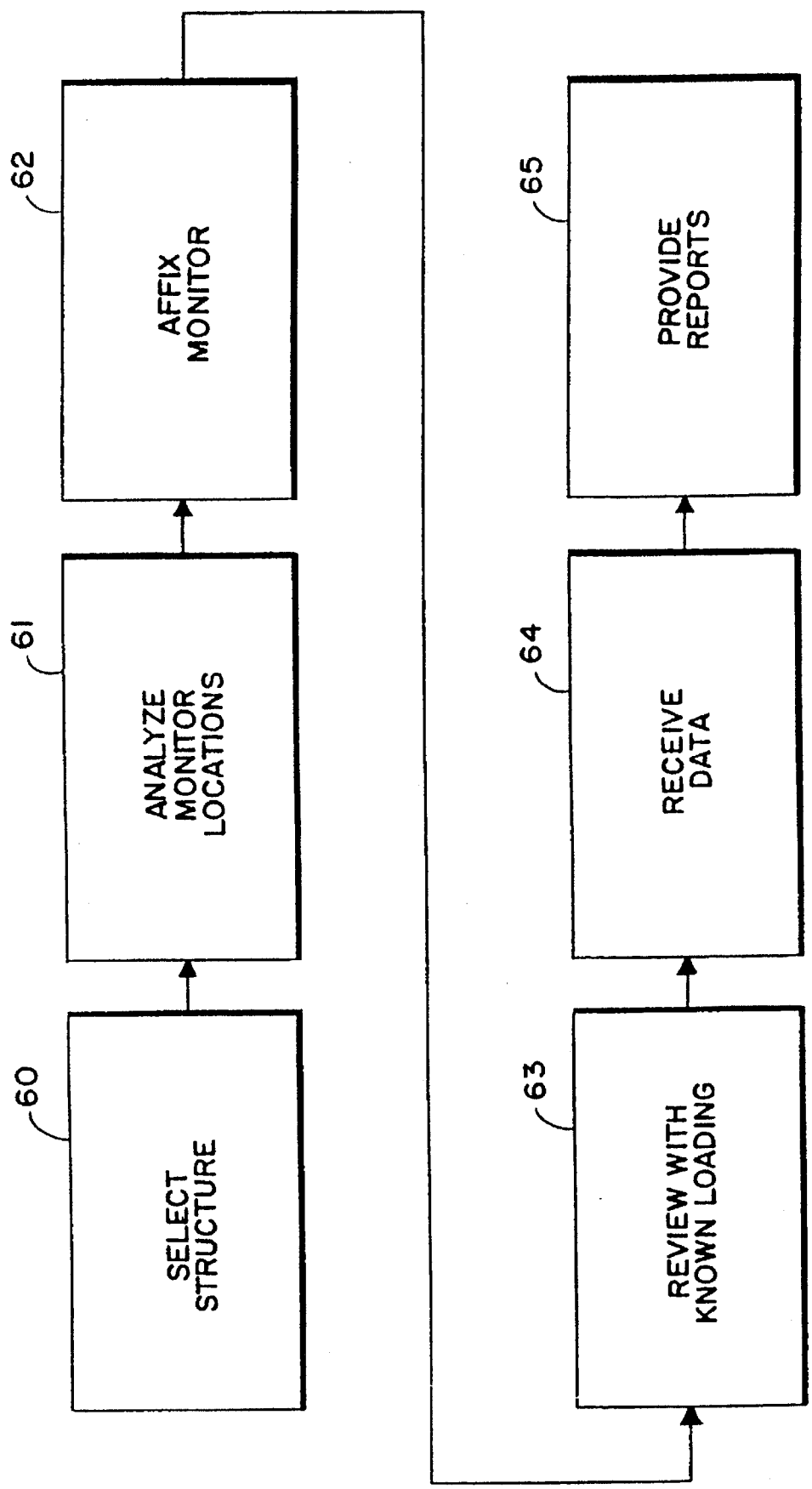
FIG. 3 is a flow chart of the method steps of the monitoring procedure.

Referring now to FIG. 3 a flow chart of the method steps involved in conducting an analysis with structural monitor 10 is shown. As previously discussed, the first step is selecting the structure for monitoring. Such a structure can be any bridge or building or transmission tower which is subject to ongoing and undetermined loads or forces which could compromise the structural integrity of the object. After the structure is selected it is then necessary to conduct the step of analyzing monitor locations 61 in order to situate sensors 12 of monitor 10 in positions on the structure demonstrating the greatest degree of action. This analysis is necessary in order to provide assurance that the forces to which the structure is subjected are detected, and to insure that the full effect of a force or load on the structure is determined. After the optimal locations for structure movement have been determined, monitor 10 is then affixed 62 to the structure.

Once the monitor is in place on the structure it is then necessary to establish baseline information regarding the particular structure. This is conducted through the step of reviewing the structure with a known loading 63 in order to determine that the sensor is functioning properly and essentially to calibrate the sensor output with a known load. This step also provides a determination of the natural frequency of the structure at a time when it is known to be structurally sound. This natural frequency may then be compared with later collected data from the structure to analyze changes in the natural frequency of the structure indicative of structure degradation. Once the baseline data has been established, monitor 10 may then be activated to receive data 64 from sensor 12. As previously discussed, the received data is then manipulated to analyze the frequency of maximum amplitude and that frequency at which the maximum amplitude occurred. As the frequency and amplitude information is collected over time it may be transmitted to a central data processing facility either by manual collection from monitor 10 or through the use of transmitter receiver devices incorporated within structural monitor 10. When the data has been manipulated and pertinent information obtained on the current natural frequency of the structure, this data may then be compared with the baseline data obtained in the step of reviewing with known loading 63 in order to provide reports 65 in which the monitor structure is evaluated and decisions as to structural maintenance and replacement may be made.

It is to be understood that while certain forms of this invention have been illustrated and described, it is not limited thereto except insofar as such limitations are included in the following claims and allowable functional equivalents thereof.

Having thus described the invention what is claimed as new and desired to be secured by Letters Patent is as follows:

1. An apparatus for detecting the deterioration in structural integrity of a bridge or a structural tower or building comprising:

a strain gauge for attachment to a structure for detecting frequency and amplitude data corresponding to linear expansion and contraction strain in the structure due to forces applied to said structure, a detector for receiving said data from said strain gauge, a computer processor in communication with said detector for reading and selecting frequency and amplitude data received from said strain gauge, a means for receiving commands from a remote data processing location, and a means for sending said data from the apparatus to said remote data processing location to permit remote location computation of the natural frequency of said structure for comparison with prior computations of the natural frequency of the structure.

2. The apparatus as claimed in claim 1 further comprising a battery to power said apparatus.

3. The apparatus as claimed in claim 2, wherein said battery is connected to a solar electricity generating panel for recharging said battery.

4. The apparatus as claimed in claim 1, wherein said means for sending data comprises a radio transmitter.

5. The apparatus as claimed in claim 1, wherein said means for receiving commands is a radio receiver.

* * * * *